Figure 1:
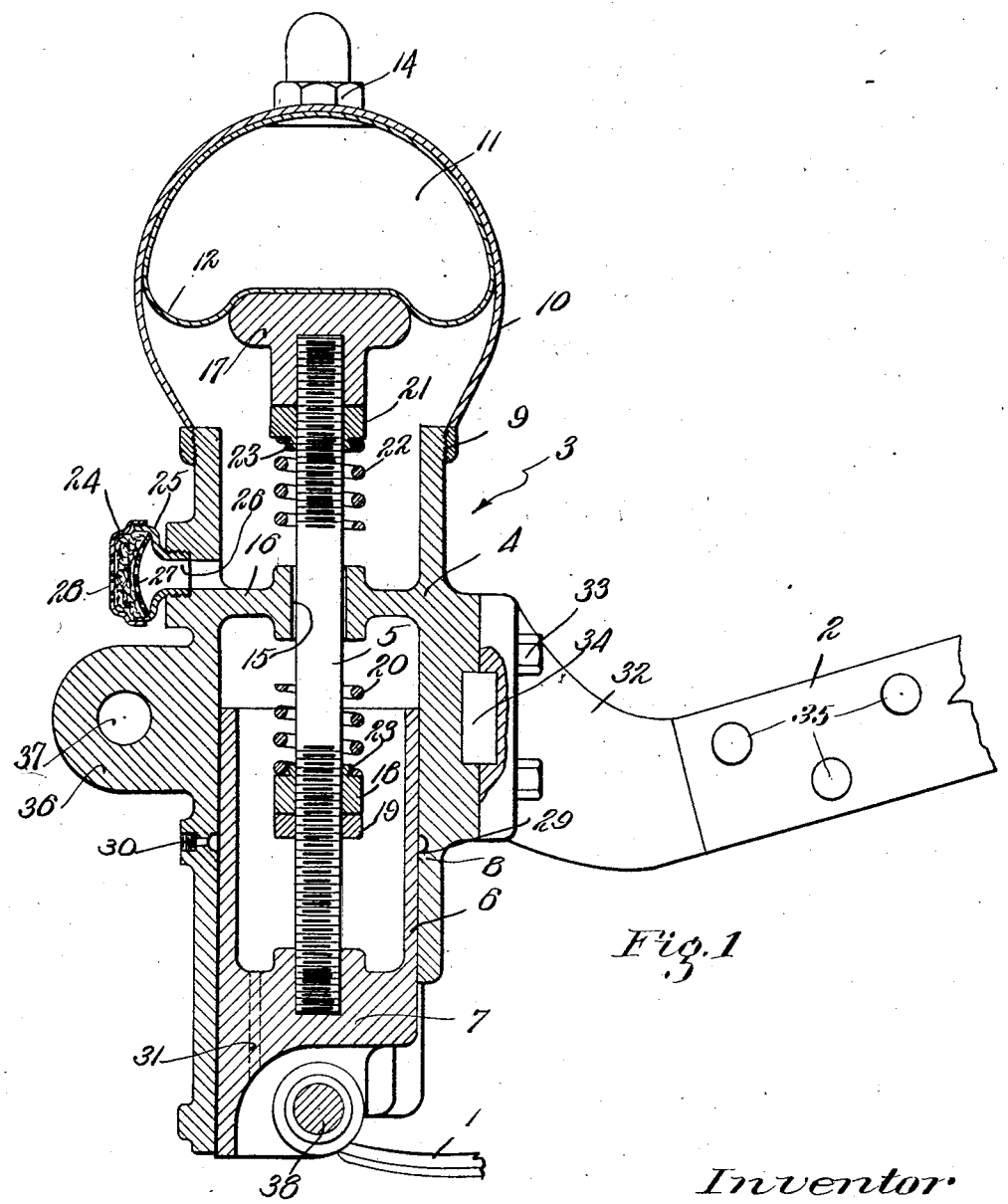

Jan. 3, 1928.

J. A. STEVENS

SHOCK ABSORBER

Filed Sept. 9, 1926

1,655,206

2 Sheets-Sheet 1

Inventor
John A. Stevens
by Roberts, Cushman & Woodbury.
Att'ys.

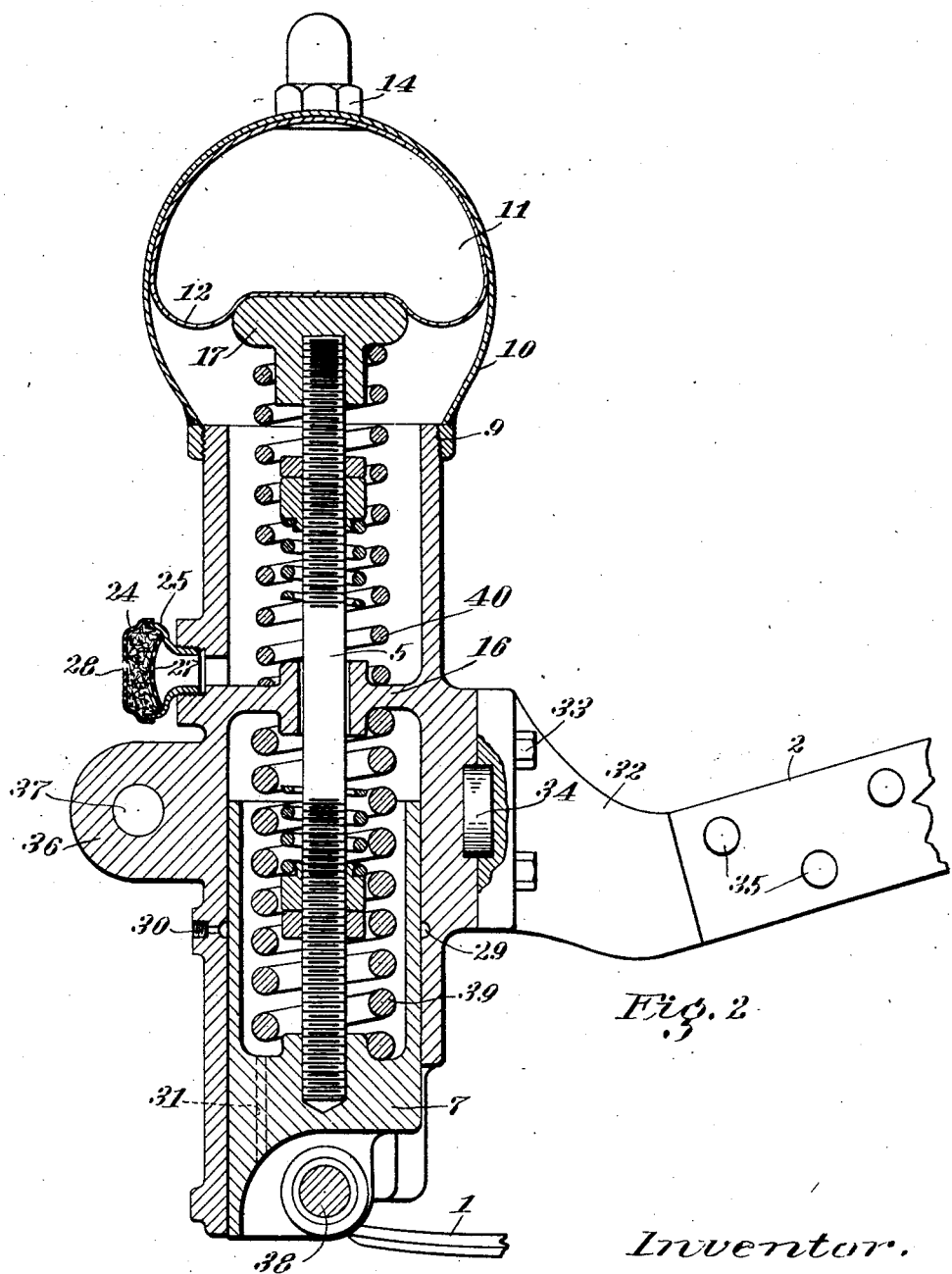

Patented Jan. 3, 1928.

1,655,206

UNITED STATES PATENT OFFICE.

JOHN A. STEVENS, OF LOWELL, MASSACHUSETTS, ASSIGNOR TO STEVENS PRODUCTS COMPANY, OF LOWELL, MASSACHUSETTS, A CORPORATION OF DELAWARE.

SHOCK ABSORBER.

Application filed September 9, 1926. Serial No. 134,404.

This invention relates to shock absorbers and more particularly to devices for absorbing shocks caused by quick relative movements of two members. A specific application of the invention is a device intended for use in connection with vehicles to absorb the shocks caused by the unevenness of the road, and while the invention is not limited to this use, it has many advantages which make it peculiarly adapted thereto.

At the present time automobiles and other vehicles are provided with springs which absorb the lighter shocks, so that the occupants thereof are only subjected to shocks of the greatest intensity which also are softened and partially absorbed, so that a rolling or oscillatory motion is all that is normally transmitted to the occupants. However, when traveling at high speeds or over rough roads, and in any case when traveling long distances, even this motion becomes disagreeable and is sometimes the cause of an illness, similar to seasickness. It is one of the objects of this invention to counteract this disagreeable motion both by cushioning the initial shock and by slowing up or dampening the rebound or recoil therefrom. This second action is especially important in the case of automobiles equipped with balloon tires which themselves act as shock absorbers, but do not slow up the rebound, which results in the undulating or oscillating motion above referred to. This invention is designed to overcome these difficulties. A further object of this invention is to simplify the construction of shock absorbers of this general type to make them inexpensive for use with cars of the lighter type. Other objects and advantages of the invention will be apparent as the description proceeds and will be particularly pointed out in the appended claims.

Referring to the drawings in which is shown by way of example two possible embodiments of the invention, Fig. 1 is a view in vertical section of the device, and Fig. 2 is a similar view of the modified form of the device.

The numeral 1 designates the usual semi-elliptic leaf spring mounted on the axle of a vehicle and adapted to support the usual chassis or frame 2. In accordance with this invention a shock absorbing device designated as a whole by the numeral 3 is inserted between one end of the leaf spring 1 and the body or frame 2 which comprises a body portion 4 adapted to enclose a piston rod 5 threaded on either end. A sleeve 6 is provided with a transverse shoulder or portion 7, forming a piston, which is threaded to the piston rod 5, and is adapted to slide within a similarly shaped portion 8 of the casing 4, the piston thus being guided in a predetermined straight path.

Surrounding the upper end of the body portion 4 of the casing and suitably attached thereto, as for example by screw threads 9, is a substantially spherical casing or cylinder 10 having enclosed therein a hollow flexible member or ball an outer casing of fabric or other flexible material containing an inner casing of rubber or other suitable material here shown merely as a single layer of material 12 providing a compression chamber 11 therein. The inner casing or ball is adapted to be inflated through a suitable valve 14 attached to the casing and extending through the top of the casing 10, the valve 14 being of the type commonly employed in connection with pneumatic casings. The piston rod 5 extends through an opening 15 in an annular abutment 16 which may be integral with the body portion 4 and located substantially midway of the piston rod when it is in its normal position. The upper end of the piston rod 5 is provided with a suitable supporting head or pneumatic casing compressing member 17 which may be screw-threaded thereto and which bears against the lower side of the casing 12 further to compress the air or other fluid within the compression chamber 11 on upward movement of the piston.

A combined buffer and check spring supporting device is provided on the piston rod 5 on one side of the abutment 16 which may comprise a nut 18 threaded on the piston rod and locked in any desire position by the check or lock nut 19. Supported on nut 18 is a heavy spring 20 which normally terminates short of the abutment 16. This spring is effective to provide a resilient stop to the inward movement of the piston rod and is especially useful in the application of the device to automobiles between the chassis and springs when a very heavy load is to be supported or when an extremely heavy shock is sustained by the vehicle; it is also useful in the event of failure of the pneumatic casing 12.

A somewhat similar buffer or stop may be provided on the other side of the abutment 16, which in this case comprises a nut 21 which may be suitably spaced from the piston head 17 if desired or fastened in any adjusted position in the same manner as nut 18 and which is provided with a heavy spring 22 normally terminating short of the abutment 16 similar to the spring 20. The springs 20 and 22 may be retained against nuts 18 and 21 respectively by means of flaring extensions 23 on each of the nuts engaging the end-most turn of their respective springs. Both spring 20 and 22 are normally not in operation, but are effective to cushion only extremely heavy shocks and rebounds respectively.

The casing may be provided above the abutment 16 with a suitable breather 24 which may be constructed of an expanding nipple 25 threaded into a suitable aperture 26 in the side of body portion 4, said nipple being provided on the inside with a screen 27 and having threaded on its larger end a perforated cover 28 confining between it and the screen 27 any suitable packing material, as for example, wool. This breather serves during the expansion and contraction of the casing 12 to exhaust or admit air from or to the chamber or space in the casing 10 surrounding the support 17, the air which is admitted to this space being filtered through the packing material in the breather 24.

The portion 8 of the body portion 4 may be provided with a suitable groove 29 extending around it and communicating at one point with an opening 30 provided with interior threads for the insertion of a suitable oil or grease cup. The piston head 7 may be provided with a drain opening 31 for excess oil or other liquid which may collect within the device.

The body portion 4 may be rigidly held to the chassis 2 in any suitable manner, as for example, by a bracket 32 which may be attached to the body 4 by bolts 33 and have therebetween a suitable dowel 34 for centering the bracket and body 4 respectively. The bracket 32 may be riveted or otherwise attached to the chassis 2 as shown at 35.

The body portion 4 is also preferably provided with a forwardly extending lug 36 having an aperture 37 therein for connection with a strut or bumper when the device is used at the front of an automobile.

The transverse portion 7 of the piston member 1 may be directly connected to the spring 1 as shown at 38 whereby the force exerted on the device by the spring 1 will be neither multiplied nor divided in its transmission to the piston.

Referring now more particularly to Fig. 2, the modification herein shown is substantially identical with that shown in Fig. 1 with the exception that there is provided between the transverse portion 7 of the piston 1 and the abutment 16 a spring 39 which acts in tandem with the pneumatic casing 12 in opposing inward movement of the piston; and there is provided between the supporting member or head 17 and the abutment 16 a spring 40, which is preferably somewhat lighter than the spring 39, tending at all times to oppose outward movement of the piston relatively to the cylinder. This construction is more applicable for heavy closed cars or to other uses where a heavy load is to be sustained at all times or extremely heavy shocks are to be absorbed.

It will be seen that I have invented a device which may take a very simple form and be inexpensive in construction, such as is applicable to light cars, and a modification thereof for heavier cars or analogous uses. I do not wish to be limited to the specific shape, size or construction of the embodiments of the device here shown and described, but merely by the scope of the appended claims.

I claim:

1. A device for absorbing the shock caused by quick relative movement of two members comprising a casing fixed to one of said members, a hollow flexible member within said casing adapted to be filled with a compressible fluid, a support within said casing adapted to engage said flexible member and to be moved to compress fluid therein, means for guiding the said support within the said casing, means for connecting the said support to the other of the said two members, spring means within said casing adapted to check the movements of said support in both forward and return directions and means for maintaining the space within the casing surrounding the said support at substantially atmospheric pressure.

2. A device for absorbing the shock caused by quick relative movement of two members comprising an outer casing fixed to one of said members, an inner casing of flexible material within said outer casing, said inner casing being adapted to contain a compressible fluid, a support carried by the other of said members and adapted to engage said inner casing, a rod connected to said support, means for guiding the said rod within said casing, an inturned annular abutment within said casing, a transverse shoulder connected to said rod, a spiral spring between said abutment and said shoulder surrounding the said rod and acting in tandem with said inner casing to oppose movement of the support in one direction, adjustable buffers on the said rod on either side of said abutment whereby to limit the stroke of said support, and a breather in said outer casing adjacent to said abutment.

3. A device for absorbing the shock caused by the quick relative movement of two members, comprising a casing fixed to one of said members, a piston rod connected to the other of said members and having a sliding contact within said casing, a hollow flexible member within said casing, said hollow member being filled with a compressible fluid, an abutment on said casing adjacent to said piston rod, shoulders on said piston rod on either side of said abutment, a spring extending from each of said shoulders to said abutment, and an additional spring fixed to each of said shoulders terminating normally short of said abutment, said additional springs being effective only on an extremely heavy shock, one of said springs serving to cushion and absorb the initial shock and the other serving to cushion and absorb the recoil therefrom.

4. A device for absorbing the shock caused by quick relative movement of two members, comprising a casing fixed to one of said members, a rod connected to the other of said members, means having a sliding contact for guiding said rod within said casing, an abutment on said casing adjacent to the said rod, shoulders on said rod on either side of said abutment, a spring extending from each of said shoulders to said abutment and an additional spring fixed to each of said shoulders and normally terminating short of said abutment, said additional springs being effective only on an extremely heavy shock, one of the springs serving to cushion and absorb the initial shock and the other the recoil therefrom.

5. A device for absorbing the shocks caused by the quick relative movement of two members comprising an outer casing adapted to be fixed to one of said members, a collapsible inner casing filled with a compressible fluid, a support having a rod connected thereto carried by the other of said members and adapted to oscillate in said outer casing, and collapse the inner casing and compress said fluid, a spring acting in tandem with said inner casing to provide a resilient resistance to movement of said support in one direction, and a second spring opposing movement of said support in the opposite direction.

Signed by me at Lowell, Massachusetts, this 30th day of August, 1926.

JOHN A. STEVENS.